United States Patent [19]

Narayan et al.

[11] 4,108,808

[45] Aug. 22, 1978

[54] NOVEL OXYALKYLATED POLYOL PREPOLYMERS, FLAME RETARDANT INTERPOLYMERS PREPARED THEREFROM, AND PROCESSES FOR THE PREPARATION THEREOF

[75] Inventors: Thirumurti Narayan, Riverview; Moses Cenker, Trenton, both of Mich.

[73] Assignee: BASF Wyandotte Corporation, Wyandotte, Mich.

[21] Appl. No.: 745,049

[22] Filed: Nov. 26, 1976

[51] Int. Cl.$^2$ ................................................ C08J 9/00
[52] U.S. Cl. .................................. 521/181; 260/29.3; 260/829; 260/613 B; 528/151; 528/153; 528/159
[58] Field of Search .............. 260/2.5 F, 54, 56, 59 R, 260/293, 829, 613 B

[56] References Cited

U.S. PATENT DOCUMENTS

| | | | |
|---|---|---|---|
| 2,462,054 | 2/1949 | Delmonte | 260/54 |
| 3,299,167 | 1/1967 | Knowlson et al. | 260/19 N |
| 3,390,107 | 6/1968 | Tashlick et al. | 260/2.5 F |
| 3,549,584 | 12/1970 | Sekera | 260/56 |
| 3,682,845 | 8/1972 | Longley et al. | 260/2.5 AP |
| 3,770,671 | 11/1973 | McFarling et al. | 260/2.5 AP |
| 3,919,127 | 11/1975 | Larsen et al. | 260/2.5 F |
| 4,016,111 | 4/1977 | Wolff et al. | 260/2.5 F |

*Primary Examiner*—Melvyn I. Marquis
*Attorney, Agent, or Firm*—Bernhard R. Swick; L. S. Van Landingham, Jr.; Robert E. Dunn

[57] ABSTRACT

Liquid oxyalkylated polyol prepolymers are prepared by oxyalkylating a prepolymer prepared from a hydroxy aromatic compound, an aldehyde and furfuryl alcohol with an alkylene oxide containing about 2-4 carbon atoms. The oxyalkylated polyol prepolymers have a viscosity of 1000-500,000 centipoises at 25° C. and contain about 1.1-6 moles of interpolymerized aldehyde, about 3.1-15 moles of interpolymerized furfuryl alcohol, and about 1-10 moles of interpolymerized alkylene oxide for each mole of interpolymerized hydroxy aromatic compound. The resultant prepolymers are highly reactive and may be further polymerized with or without monomers such as polyisocyanate to produce flame retardant solid or cellular interpolymers. Flame retardant solid or cellular polyurethanes are prepared in one variant by interpolymerizing organic polyisocyanates with the oxyalkylated polyol prepolymers. In another variant, flame retardant closed cell cellular interpolymers are provided. Processes are provided for preparing the aforementioned novel oxyalkylated polyol prepolymers and solid or cellular interpolymers.

56 Claims, No Drawings

NOVEL OXYALKYLATED POLYOL PREPOLYMERS, FLAME RETARDANT INTERPOLYMERS PREPARED THEREFROM, AND PROCESSES FOR THE PREPARATION THEREOF

THE BACKGROUND OF THE INVENTION

1. The Field of the Invention

The present invention broadly relates to novel liquid oxyalkylated polyol prepolymers and processes for the preparation thereof. The invention also relates to novel solid or cellular interpolymers prepared from the oxyalkylated polyol prepolymers, and processes are further provided for preparing the solid or cellular interpolymers. In some of the specific variants, the invention is concerned with novel closed cell cellular interpolymers and solid or cellular polyurethanes prepared from the oxyalkylated polyol prepolymers.

2. The Prior Art

Polyol prepolymers have been prepared heretofore by interpolymerizing certain hydroxy aromatic compounds, aldehydes and furfuryl alcohol. The resultant non-oxyalkylated polyol prepolymers are known to be reactive and capable of being further polymerized. However, the prior art non-oxyalkylated polyol prepolymers usually contain less than 3.0 moles of interpolymerized furfuryl alcohol for each mole of the interpolymerized hydroxy aromatic compound and/or upon further polymerization, the interpolymers prepared therefrom do not consistently have good mechanical and/or physical properties in combination with a high degree of flame retardance. It was also impossible to prepare foams therefrom having predominately closed cells.

The above prior art non-oxyalkylated polyol prepolymers also tend to have widely varying properties from run to run, and especially with respect to the viscosity, molecular weight and ratio of interpolymerized monomers. Upon oxyalkylation and further polymerization of the prior art polyol prepolymers, it was not possible heretofore to prepare solid or cellular interpolymers having predictable and reproducible mechanical and/or physical properties. This is especially true when preparing in place low density cellular interpolymers having densities of approximately 1–10 pounds per cubic foot of the type often used for thermal and/or sound insulation. The flame retardant properties of these solid or cellular prior art interpolymers also are not outstanding when used in environments where a fire hazard exists such as in certain construction and industrial applications.

As a result of the aforementioned and other disadvantages and/or deficiencies, the art has long sought without success an entirely satisfactory process for preparing novel liquid prepolymers of the above defined type which have reproducible molecular weights, viscosities and interpolymerized monomer contents, a process for the oxyalkylation thereof to produce novel oxyalkylated polyol prepolymers which likewise have these properties, and also a process whereby the resultant prepolymers may be further polymerized with or without other monomers to produce improved interpolymers characterized by excellent mechanical and/or physical properties in combination with exceptional flame retardant properties. The prior art also has long sought a process for preparing closed cell foam from the prepolymers. However, such processes and the novel prepolymer and interpolymer products prepared thereby were not available prior to the present invention.

THE SUMMARY OF THE INVENTION

The aforementioned disadvantages and/or deficiencies of the prior art are overcome by providing a novel liquid oxyalkylated polyol prepolymer, and/or by thereafter employing the same in the preparation of the improved flame retardant solid or cellular interpolymers of the invention. The oxyalkylated polyol prepolymer is prepared by interpolymerizing monomers including a hydroxy aromatic compound, an aldehyde and furfuryl alcohol to produce a novel polyol prepolymer and then oxyalkylating the same under conditions to be described more fully hereinafter whereby the resultant reaction product has a viscosity of about 1000–500,000 centipoises at 25° C. and contains about 1.1–6 moles of interpolymerized aldehyde, about 3.1–15 moles of interpolymerized furfuryl alcohol and about 1–10 moles of interpolymerized alkylene oxide for each mole of interpolymerized hydroxy aromatic compound. Improved solid or cellular flame retardant interpolymers are provided by polymerizing the oxyalkylated polymers with or without other monomers or prepolymers. The cellular interpolymers may have a closed cell structure. Solid or cellular interpolymers characterized by markedly enhanced flame retardant properties are provided by polymerizing the oxyalkylated polyol prepolymers, with or without other monomers or prepolymers, in the presence of unreacted furfuryl alcohol. The invention additionally provides novel processes for preparing the aforementioned oxyalkylated polyol prepolymer and flame retardant interpolymers.

The detailed description of the invention and the specific examples appearing hereinafter may be referred to for a more complete and comprehensive understanding of the invention.

THE DETAILED DESCRIPTION OF THE INVENTION INCLUDING THE PRESENTLY PREFERRED VARIANTS AND EMBODIMENTS THEREOF

The oxyalkylated polyol prepolymers of the invention are prepared by interpolymerizing in an aqueous reaction medium at least three monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1–8 carbon atoms, and (c) furfuryl alcohol to produce a reactive liquid prepolymer. Water and unreacted furfuryl alcohol are removed from the resultant reaction mixture under reduced pressure until the prepolymer contains not more than about 1% by weight of water. Thereafter, the prepolymer is oxyalkylated with about 1–10 moles of an alkylene oxide containing about 2–4 carbon atoms to produce an oxyalkylated polyol prepolymer. The interpolymerization and oxyalkylation are continued until the prepolymer thus produced has a viscosity of about 1000–500,000 centipoises at 25° C. and contains about 1.1–6 moles of interpolymerized aldehyde, about 3.1–15 moles of interpolymerized furfuryl alcohol and about 1–10 moles of interpolymerized alkylene oxide for each mole of the interpolymerized hydroxy aromatic compound. The resultant liquid oxyalkylated polyol prepolymers are highly reactive and may be used with other monomers which are reactive with active hydrogen-containing compounds in the preparation of novel flame retardant solid or cellular interpolymers. It will be appreciated that there are certain preferred variants and embodiments of the invention, and that such preferred variants and embodiments will be described in greater detail and with greater particularity hereinafter.

The hydroxy aromatic compounds which are useful in practicing the present invention are reactive with the aldehyde. Examples include phenol, resorcinol, cresol, xylenol, chlorophenol, bisphenol-A, alpha-naphthol, betanaphthol, and admixtures containing two or more thereof. Phenol is preferred in most instances.

The aldehydes which are useful contain about 1-8 carbon atoms and are reactive with the selected hydroxy aromatic compound. Mixtures containing two or more aldehydes having 1-8 carbon atoms may be used. Preferred aldehydes contain about 1-5 carbon atoms and include formaldehyde, acetaldehyde, propionaldehyde and furfuraldehyde, of which formaldehyde usually gives the best results. Suitable sources of formaldehyde include its commercially available forms such as formalin which is usually a 37 to 45% aqueous solution of formaldehyde in water, paraformaldehyde which is a solid linear polymer of formaldehyde, and trioxane which is a solid trimer of formaldehyde, all of which are intended to be embraced herein by the term formaldehyde. For the purposes of the present invention, the total number of monomeric units of formaldehyde making up the paraformaldehyde and trioxane are considered to be equivalent to monomeric formaldehyde when mole ratios are calculated.

The furfuryl alcohol is reactive with the aforementioned hydroxy aromatic compound, aldehyde and/or the reaction products thereof such as resoles. The term "furfuryl alcohol" as used herein embraces monomeric furfuryl alcohol and the low molecular weight oligomers or polymers thereof containing several monomeric units such as the dimer, trimer, tetramer, pentamer and admixtures thereof. Monomeric furfuryl alcohol often contains such oligomers or polymers in varying concentrations and for the purposes of the present invention, the total monomeric units making up such oligomers or polymers are considered to be equivalent to monomeric furfuryl alcohol when mole ratios are calculated. It is understood that high molecular weight preformed homopolymers of furfuryl alcohol are not intended to be embraced by the term furfuryl alcohol.

The alkylene oxide contains about 2-4 carbon atoms and specific examples include ethylene oxide, propylene oxide and butylene oxide. Ethylene oxide or propylene oxide is usually preferred and mixtures of two or more alkylene oxides may be used.

The oxyalkylated polyol prepolymers are advantageously prepared by interpolymerizing the aforementioned monomers by one of three presently preferred variants of the process of the invention. In accordance with one of the variants, a preformed water soluble resole resin containing about 1.1-3 moles of interpolymerized aldehyde for each mole of interpolymerized hydroxy aromatic compound is reacted with furfuryl alcohol in an aqueous medium under acidic conditions. The water content of the aqueous medium is sufficient to dissolve the reactants and provide a suitable initial fluidity for the reaction mixture and may be, for example, about 50-200% by weight of the resole resin and preferably about 100-150% by weight. The furfuryl alcohol should be present in a substantial excess over that amount theoretically required to provide the desired mole ratio of interpolymerized furfuryl alcohol to interpolymerized hydroxy aromatic compound in the final prepolymer product. The excess monomeric or unreacted furfuryl alcohol acts as a fluidizing solvent for the viscous polyol prepolymer reaction product and may be present in an amount, for example, of about 1-10 moles and preferably about 3-7 moles above the 3.1-15 moles of interpolymerized furfuryl alcohol present in the final prepolymer product. Thus, the reaction mixture may contain about 5-25 moles and preferably about 7-15 moles of furfuryl alcohol for each mole of hydroxy aromatic-compound interpolymerized in the resole resin. The reaction may be carried out at a suitable temperature such as, for example, about 50°-120° C. and preferably at about 80°-100° C. The pH of the reaction mixture should be below 5 and preferably is about 1-3.

The interpolymerization is continued until the desired mole ratio of furfuryl alcohol has reacted with the resole resin and the interpolymerization may be terminated thereafter by addition of sufficient base to adjust the reaction mixture to a pH value of not less than about 5.0, and preferably about 6-8. The reaction time usually will vary inversely with the reaction temperature, but typical reaction times are about 0.25-5 hours and preferably about 0.5-2 hours. The acid used in acidifying the reaction mixture may be any suitable inorganic or organic acid which is capable of providing the desired pH value and which is not reactive with the reactants and/or reaction product in an adverse manner. Mixtures of mineral and/or organic acids may be used. Examples of mineral acids include hydrochloric acid, sulfuric acid and phosphoric acid. Examples of organic acids include carboxylic acids containing 1-8 carbon atoms such as formic acid, acetic acid, oxalic acid and chloracetic acid, and aromatic sulfonic acids containing 6-12 carbon atoms. Examples of bases which may be used to adjust the pH value of the reaction mixture and thereby terminate the reaction include the alkali metal and alkaline earth metal oxides and hydroxides, such as sodium hydroxide, potassium hydroxide, calcium hydroxide and barium hydroxide, as well as their corresponding oxides, and tertiary amines or amino alcohols containing 3 to 12 carbon atoms.

Thereafter, most of the water initially present, the water of reaction and the unreacted furfuryl alcohol may be removed from the reaction mixture under reduced pressure and/or at elevated temperature following conventional prior art procedures and conditions such as those used to remove water and reactants from reaction mixtures in the preparation of resole resins. A typical final temperature is about 40°-100° C. and preferably about 70° C. at a reduced pressure of about 1 Torr. However, as is well understood in this art, the temperature is sufficiently high and/or the pressure is sufficiently low to reduce the amount of water and/or furfuryl alcohol to desired levels without adverse thermal decomposition of the prepolymer product. The water content of the polyol prepolymer should be less than 1% by weight and preferably less than 0.5% by weight. Typical water contents are about 0.01-1% by weight and preferably about 0.05-5% by weight. The water contents referred to herein are as determined by the Karl Fischer method.

Preformed liquid resole resins suitable for interpolymerizing with furfuryl alcohol are well known and are disclosed in numerous patents and other publications. Examples of three textbooks relating to the preparation of resole resins are *Preparative Methods of Polymer*

*Chemistry,* by Sorenson and Campbell, Interscience Publishers, N.Y., N.Y.; *The Chemistry of Phenolic Resins,* by Robert W. Martin, John Wiley and Sons, Inc., New York, New York (1956); and *Plastic Foams,* edited by Kurt C. Frisch, et al., Marcel Dekker, Inc., New York, New York (1973). The disclosures of these textbooks and the references cited therein are incorporated herein by reference. As a general rule, liquid resole resins are prepared by reacting one or more hydroxy aromatic compounds with one or more aldehydes in aqueous phase and in the presence of an alkaline catalyst, and in amounts to provide the aforementioned interpolymerized ratios. Examples of alkaline catalysts include the alkali metal hydroxides, and the alkaline earth metal hydroxides. of which sodium and/or potassium hydroxides are usually preferred. The amount of the alkaline catalyst is in accordance with prior art practice and may be for example, about 0.5-5% by weight of the phenol. The pH value of the reaction mixture may be, for example, about 8-10. The reaction may proceed under agitation at a temperature of about 50°-100° C. over a period of, for example, about 1-10 hours. At the end of the reaction period, the reaction mixture is neutralized by addition of a suitable acid such as hydrochloric acid or sulfuric acid to a pH value of approximately 6-7 and is dehydrated under vacuum. The resultant preformed resole resin is then reacted with the furfuryl alcohol. The monomeric units interpolymerized in the resole resin are considered to be monomers in calculating the mole ratios referred to herein.

Following removal of the water and some unreacted furfuryl alcohol and any other volatile materials which are removed incidentally therewith, the resultant prepolymer is oxyalkylated with about 1-10 moles, and preferably with about 1-5 moles, of the alkylene oxide for each mole of interpolymerized hydroxy compound. When more than about one or two moles of the alkylene oxide are interpolymerized with each mole of interpolymerized hydroxy aromatic compound, it is usually preferred that the alkylene oxide be added to the reaction mixture in a molar excess of about 5-25%, and preferably about 10-15%, over the theoretical molar amount. A prior art oxyalkylation catalyst may be present in a conventional amount such as organic and inorganic bases and Lewis acid type catalysts. Examples of organic base catalysts include amines having one or more organo groups containing, for example, 1-5 carbon atoms attached to the nitrogen atoms. Tertiary amines are preferred and especially trialkylamines wherein the alkyl groups contain about 1-5 carbon atoms. Triethylamine usually gives the best results. Examples of inorganic base catalysts include the alkali metal and alkaline earth metal oxides and hydroxides of which sodium hydroxide and potassium hydroxide are usually preferred. Examples of Lewis acid type catalysts include boron trifluoride and/or the etherates thereof, ferric chloride and ferric bromide. The catalyst may be present in a known catalytically effective amount which may vary greatly from catalyst to catalyst. Typical amounts of catalyst are about 0.001-5% by weight of the prepolymer and usually about 0.1-2% by weight. The reaction temperature may be about 60°-150° C. and preferably is about 80°-130° C. The reaction time often varies inversely with the reaction temperature and may be, for example, about 1-15 hours and preferably is about 2-8 hours. Very satisfactory reaction conditions are a reaction temperature of about 120° C. for a period of about 3-5 hours.

After completing the reaction, volatiles are removed under reduced pressure and/or at elevated temperature such as described previously for water and/or unreacted furfuryl alcohol. The resultant liquid oxyalkylated polyol prepolymer is substantially anhydrous and usually contains less than 1% by weight of water and preferably contains less than 0.5% by weight of water. It may be further interpolymerized with or without other monomers to produce solid or foam interpolymers, as will be described more fully hereinafter.

In a second variant, the oxyalkylated polyol prepolymer may be prepared by interpolymerizing 1.1-6 moles of the aldehyde for each mole of the hydroxy aromatic compound in an aqueous medium under alkaline reaction conditions resulting in the preparation of a resole resin. The catalyst may be a base such as an alkali metal oxide or hydroxide as aforementioned in a quantity to provide a pH value of about 7.5-11 and preferably about 8-9. The interpolymerization may be carried out at an elevated temperature such as 50°-120° C., and preferably at about 80°-100° C. over a period of approximately 0.5-5 hours and preferably about 1.5-3 hours. Thereafter the reaction mixture may be acidified by addition of an acid and about 5-25 moles of the furfuryl alcohol are added and reacted therewith at a pH of less than 5 and preferably about 1-3 until 3.1-15 moles of furfuryl alcohol have interpolymerized with the resole as aforementioned. The reaction mixture containing the prepolymer is then neutralized and the water of reaction and some of the excess furfuryl alcohol are removed under reduced pressure and/or elevated temperature as in the first variant. Thereafter, the polyol prepolymer is oxyalkylated followed by stripping the volatiles therefrom under reduced pressure as in the first variant. It is understood that the general procedure of the second variant following the resole preparation step may be substantially the same as in the first variant.

In accordance with a third variant, the oxyalkylated polyol prepolymer may be prepared by interpolymerizing one mole of the hydroxy aromatic compound, 1.1-6 moles of the aldehyde and 5-25 moles of furfuryl alcohol in an aqueous reaction medium under acidic reaction conditions until 1.1-6 moles of aldehyde and 3.1-15 moles of furfuryl alcohol have interpolymerized with each mole of the hydroxy aromatic compound. The pH value of the reaction mixture is substantially less than 7 and is preferably less than 5 such as 1-3. The reaction time may be about 1-10 hours and is preferably about 2-4 hours. Thereafter, the reaction mixture containing the polyol prepolymer may be neutralized by addition of a base and all of the water and part of the excess unreacted furfuryl alcohol may be removed under reduced pressure and at elevated temperature. The base and acid used for controlling the pH value and the procedure for removing water and part of the unreacted furfuryl alcohol may be substatially the same as in the first variant. Thereafter, the polyol prepolymer is oxyalkylated followed by stripping the volatiles therefrom under reduced pressure as in the first variant.

The aforementioned three variants for preparing the oxyalkylated polyol prepolymers of the invention are illustrated in the examples appearing hereinafter. In each instance, the reaction product is a reactive liquid oxyalkylated polyol prepolymer which may be cured to produce a rigid interpolymer. The oxyalkylated polyol prepolymer has a viscosity of about 1000-500,000 centipoises and preferably about 2000–100,000 centipoises at 25° C. and contains about 1.1–6 moles and preferably about 1.1–3 to 1.5–3 moles of interpolymerized aldehyde, about 3.1–15 moles and preferably about 3.1–10 moles of interpolymerized furfuryl alcohol, and about 1–10 moles and preferably about 1–5 moles of interpolymerized alkylene oxide for each mole of the hydroxy aromatic compound interpolymerized therewith. In instances where a polyurethane interpolymer is prepared from the oxyalkylated prepolymer, then for best results the water content should be less than 1% and the unreacted furfuryl alcohol content should be less than 5% by weight. Where further improved flame retardancy is to be imparted to an interpolymer prepared from a viscous oxyalkylated prepolymer and/or a low density foam is prepared from a viscous oxyalkylated prepolymer, then the unreacted furfuryl alcohol content should be increased to about 1–10 moles and preferably to about 3–8 moles for each mole of the interpolymerized hydroxy aromatic compound.

The resultant liquid oxyalkylated polyol prepolymers are highly reactive and may be further interpolymerized with or without other monomers to prepare solid or foam interpolymers. In one variant of the invention, an acid catalyst is admixed with the oxyalkylated polymer in an amount to catalyze the further interpolymerization thereof and produce a hardened interpolymer therefrom. If desired, elevated temperatures such as 50°–100° C. may be used but are not necessary as the prepolymer is highly reactive. Examples of acid catalysts include mineral acids such as hydrochloric acid, sulfuric acid and phosphoric acid, alkyl acid phosphates such as ethyl acid phosphate, dialkyl pyrophosphates such as dimethyl acid pyrophosphate, and organic acids such as oxalic acid, chloroacetic acid and aromatic sulfonic acids. The catalyst may be employed in an amount of, for example, about 0.5–20% by weight of the oxyalkylated polyol prepolymers. In general, the type and amount of acid catalyst and the curing conditions for the liquid oxyalkylated polyol prepolymer may be approximately the same as for liquid phenol-formaldehyde resoles of the prior art. The three textbooks mentioned hereinbefore may be referred to for further details.

In instances where it is desired to prepare a solid interpolymer, then the further interpolymerization of the liquid oxyalkylated prepolymer is preferably carried out under conditions whereby an undesirable number of cells do not form in the resultant interpolymer. Thus, solid polymers are prepared in the absence of a blowing agent and, if desired, under superatmospheric pressure to reduce the tendency of cells to form in the curing oxyalkylated prepolymer. When a foam is prepared from the oxyalkylated prepolymer, it is necessary to admix a blowing agent and a surfactant or stabilizing agent therewith prior to or during curing with the acid catalyst.

The surfactant may be a suitable stabilizing agent of the type used in stabilizing phenolic resole resin foams. A large number of suitable surfactants are known and are disclosed in the three textbooks mentioned hereinbefore and the references cited therein. The preferred stabilizing agents are water soluble and acid stable surface active agents, and for best results they are also non-hydrolyzable. Commonly used surfactants include siloxane-oxyalkylene copolymers such as those disclosed in United States Pat. No. 3,271,331, British Pat. No. 1,091,238 and Netherlands Application No. 6,609,096, and the silicones marketed by Union Carbide Corporation and identified as "L-530, L-5310, L-5340 and L-5410." The products of the condensation of ethylene oxide with castor oil and alkyl phenols disclosed in British Pat. No. 1,062,850, and the polyoxyethylene sorbitan fatty acid esters disclosed in U.S. Pat. No. 3,300,419, or the "Tween" series of surfactants are also useful. Additional surfactants of the cationic and anionic type are disclosed in U.S. Pat. No. 2,933,461 and British Pat. No. 586,199, respectively. A proprietary product marketed by Dow Corning Corporation and identified as "DC-193", which is said to be a polyalkyl siloxane-polyoxyalkylene copolymer, is especially useful. Other nonionic surfactants are polyethers and polyalcohols, including the condensation products of alkylene oxides, such as ethylene oxide and propylene oxide, with alkyl phenols, fatty acids, alkyl silanes and silicones. The surface active agents may be employed in the amounts recommended in accordance with prior art practice such as about 0.5–5% by weight of the oxyalkylated prepolymer. Better results often are obtained when using amounts varying from about 1 to about 3 percent by weight based on the weight of the oxyalkylated prepolymer, with best results usually being achieved at about 2 percent by weight. The disclosure of the above mentioned patents are incorporated herein by reference.

Prior art volatile blowing agents for phenolic resole resins may be used as the blowing agent for the oxyalkylated prepolymer. Numerous blowing agents of this type are known and are disclosed in the three textbooks mentioned hereinbefore and the references cited therein. The halogenated hydrocarbon blowing agents usually contain about 1–3 carbon atoms and have one or more halogen atoms attached directly thereto such as fluorine, chlorine, and bromine. Suitable halogenated hydrocarbon blowing agents are sold under the trademark Freon ®, such as Freon 11 and Freon 113. Other halogenated hydrocarbon blowing agents include methylene chloride, ethyl chloride, monochlorodifluoromethane, dichlorodifluoromethane, 1,2-dichloro-1,1,2,2-tetrafluorethane, tetrachloroethane, trichloromethane, and 1,2,2-trichloro-1,1,2-trifluoroethane.

The blowing agent may be present in the oxyalkylated prepolymer to be foamed in about the same quantities as employed in preparing the prior art foams, i.e., in an amount to provide a desired density in the foam product. The foam density may be, for example, about 1–50 pounds per cubic foot and is preferably about 1–30 pounds per cubic foot. Typical weight percentages are about 1–40 parts by weight and preferably about 10–25 parts by weight, based upon the weight of the oxyalkylated prepolymer. The blowing agent and surfactant are admixed in the oxyalkylated prepolymer following prior art techniques, such as by vigorous agitation with a rotary beater or propeller type agitator. The general techniques and procedures that are used in preparing foam from the oxyalkylated prepolymer may be substantially the same as used in preparing prior art phenolic foams.

The oxyalkylated polyol prepolymers also may be further interpolymerized with an additional monomer or prepolymer which is capable of reacting with the active hydrogen thereof to produce a solid interpolymer. The presently preferred monomers or prepolymers to be reacted with the oxyalkylated polyol prepolymers are organic polyisocyanates of the type employed in the preparation of polyurethanes from polyols. A large number of such organic polyisocyanates are known and may be used in practicing the the present invention. The presently preferred organic polyisocyanates include diphenylmethane diisocyanate, crude diphenylmethane diisocyanate, 2,4- and 2,6- isomeric mixtures of toluene diisocyanate, prepolymers containing active isocyanate groups and quasiprepolymers containing active isocyanate groups. Additional examples of organic polyisocyanates are disclosed in U.S. Pat. No. 3,186,969, 3,398,094, 3,470,118, 3,682,845, 3,686,101, 3,770,671 and 3,872,034, the disclosures of which are incorporated herein by reference. The amount of the organic polyisocyanate that is used may be in accordance with the prior art practices that are disclosed in the above patents. It is usually preferred that the ratio of the organic polyisocyanate to the oxyalkylated prepolymer be about 1:4 to 1:1 and preferably 1.5:4 to 3:4 on a weight basis. The preferred ratio is usually about 1:2 by weight.

When producing polyurethanes, an admixture is prepared containing the organic polyisocyanate and the oxyalkylated polyol prepolymer in an amount as discussed above and a suitable catalyst is admixed therewith an an amount to effect the curing. Elevated curing temperatures such as 50°-100° C. usually are not necessary, but may be used when desired. The catalyst may be an acid catalyst such as discussed above for curing the oxyalkylated prepolymer alone, but preferably a catalyst mixture is employed which includes both the acid catalyst and a prior art catalyst for curing polyurethanes. Numerous examples of catalyst for curing polyurethanes are disclosed in the above mentioned patents. The presently preferred polyurethane catalyst is an organic amine containing a tertiary amino group such as triethanolamine and other tertiary hydroxyamines containing, for example, about 1-5 carbon atoms in the chains attached to the nitrogen atom. Still other catalysts for curing polyurethanes include organotin compounds. The polyurethane catalyst may be employed in the quantities suggested in the prior art including the above patents. The acid catalyst may be used in the quantities mentioned hereinbefore and the polyurethane catalyst may be used in an amount of, for example, about 0.01-5% by weight and preferably 0.1-2% of the oxyalkylated polyol prepolymer. The oxyalkylated polyol prepolymer should contain less than 1% by weight of water, and preferably less than 0.5% by weight when preparing closed cell foams having a closed cell content of at least 85% and preferably 95-100%.

In instances where a solid polyurethane interpolymer is to be prepared, an admixture containing the oxyalkylated polyol prepolymer, organic polyisocyanate and catalyst in the quantities discussed above is prepared under vigorous conditions of agitation so as to produce a uniform mixture. The resultant mixture is then shaped into a desired configuration and is allowed to cure at room or elevated temperature until a hardened interpolymer shape is formed. When a polyurethane foam is prepared, a surfactant or stabilizing agent and a blowing agent are admixed in the formulation to thereby produce a cured cellular structure. The surfactant and blowing agent, as well as the general procedure to be used in preparing polyurethane foams, may be as previously discussed when preparing foam from the oxyalkylated prepolymer alone.

The solid interpolymer products prepared from the polyol prepolymer alone, or in admixture with other monomers such as organic polyisocyanates, are useful in preparing plastic articles. The curable compositions also are useful as casting resins. The open cell foam products prepared from the oxyalkylated polyol prepolymer alone, or the closed cell foams prepared by interpolymerization with monomers such as organic polyisocyanates, are useful as thermal or sound insulation. The open cell foam has insulation properties comparable to fiberglass and the closed cell foam is comparable to the polyurethane foam prepared from other types of polyols.

The foregoing detailed description and the following specific examples are for purposes of illustration only, and are not intended as being limiting to the spirit or scope of the appended claims. Certain proprietary products which are well known to those skilled in this art are referred to in the examples by their trademarks or tradenames. The chemical compositions of these proprietary products are defined below:

1. "D.C.-193" is a polyalkylsiloxane-polyoxyalkylene copolymer sold by Dow Corning for use as a foam stabilizer;

2. "Freon 113" or "F-113" is a fluorocarbon blowing agent, namely, trichlorotrifluoroethane;

3. "PAPI" is a polyisocyanate, namely crude diphenylmethane diisocyanate produced by Upjohn Company and solid under this tradename.

4. "THANOL polyol R-350 X" is an amine polyol sold by the Jefferson Chemical Company which is prepared by reaction of propylene oxide with the Mannich condensation product of formaldehyde, phenol and diethanolamine having a hydroxyl number of 530 and a nitrogen content of 4.17% by weight.

5. "Polyol A" is polyoxyethylated trimethylolpropane of 250 equivalent weight.

6. "TKEA Polyol" is N,N,N',N'-tetrakis(2-hydroxypropyl)ethylenediamine.

7. "DBTDA" is dibutyltin diacetate.

The properties of the cured foams in the Examples were determined by their respective American Society for Testing Materials (ASTM), National Bureau of Standards (NBS), etc., test method procedures approximately two days after preparation without post curing except where noted. The cured foam properties were determined by the following test methods.

| | Test Methods |
|---|---|
| Foam Property | Test Method |
| Density | ASTM D-1622-63 (1970) |
| K-Factor | ASTM C-518-177-45 |
| Compression Strength | ASTM D-1621-73 |
| Friability | ASTM C-421 |
| Flame Retardancy (Butler Chimney Test) | ASTM D-3014 |
| Smoke Density | NBS Chamber (Sample thickness 2 × 2 × 1 inches) $D_m$ = Maximum Smoke density |

EXAMPLE I

This Example illustrates the preparation of phenol-formaldehyde resole resins for further reaction with furfuryl alcohol when preparing prepolymers in accordance with the invention. The experimental details for three different runs are given in Table I.

A three-liter reaction vessel equipped with a reflux condenser, addition funnel, thermometer, stirrer and an inlet for nitrogen gas was charged with the amounts of phenol and formaldehyde indicated in Table I. The formaldehyde was added as a 37% by weight aqueous solution (formalin). Sufficient aqueous sodium hydroxide (30% by weight) was added to the reaction mixture to adjust the pH value to 8.5.

The resultant reaction mixture was gradually heated to a reaction temperature of 90° C., and the temperature was maintained at 90° C. over a reaction period of 2 hours. The reaction product was cooled to 40° C. and sufficient aqueous sulfuric acid (30% by weight) was added to reduce the pH value to 5.5. Thereafter water was removed under reduced pressure until the water content was as noted in Table I. The water was removed initially using a water aspirator, and thereafter using a vacuum pump until the final pot temperature was 50° C. at 1 Torr pressure. The hydroxyl number and Brookfield viscosity (cps at 25° C.) were determined following conventional prior art procedures. The resultant experimental details and data are tabulated below in Table I.

TABLE I

| Preparation of Resole Resins | | | |
|---|---|---|---|
| Resole Resin Number | 1 | 2 | 3 |
| Phenol, g. | 376 | 752 | 752 |
| Phenol, moles | 4 | 8 | 8 |
| *Formalin, g. | 888 | 1776 | 1776 |
| Formaldehyde, moles | 11 | 22 | 22 |
| Yield of Resole, g. | 622 | 1203 | 1309 |
| Hydroxyl Number | — | 1077 | — |
| Water, % (Karl Fischer Method) | — | 0.004 | 0.04 |
| Brookfield Viscosity, cps. at 25° C.) | — | 332 | 500 |

*37% aqueous formaldehyde solution

EXAMPLE II

This Example illustrates the preparation of additional phenol-formaldehyde resole resins. The general procedure of this Example was the same as that of Example I except where indicated to the contrary. The experimental details and data are recorded hereinafter in Table II.

TABLE II

| | PREPARATION OF RESOLE RESINS | | | | | | | | | |
|---|---|---|---|---|---|---|---|---|---|---|
| Resole Resin Number | 1 | 2 | 3 | 4 | 5 | 6 | 7 | 8 | 9 | 10 |
| Phenol g. | 846 | 1126 | 188.2 | 1128 | 1034 | 1128 | 188.2 | 372 | 282 | 846 |
| (moles) | (9) | (12) | (2) | (12) | (11) | (12) | (2) | (3.96) | (3) | (9) |
| Formaldehyde 37%, g. | 1095 | 1988 | 324.4 | 2664 | 2442 | 2664 | 486.5 | 973 | 973 | 2997 |
| (moles) | (13.5) | (24.5) | (4) | (32.8) | (30.1) | (32.8) | (6) | (12) | (12) | (37) |
| Formaldehyde-phenol ratio | 1.5 | 2.0 | 2.0 | 2.73 | 2.73 | 2.73 | 3.0 | 3.0 | 4.0 | 4.1 |
| pH of reaction | 8.5 | 8.5 | 8.5 | 8.5 | 8.5 | 8.5 | 8.5 | 8.5 | 8.5 | 8.5 |
| Reaction temp. ° C/time | 90/2 | 90/2 | 70/2 | 90/2 | 90/2 | 90/2 | 90/2 | 90/2 | 90/2 | 90/2 |
| Resole, g. | 1169 | 1761 | 283 | 1965 | 1832 | 1965 | 309 | 644 | 481 | 1729 |
| Volatiles, g. | 702 | 1353 | 234 | 1762 | 1444 | 1778 | 340 | 648 | 703 | 2031 |
| Viscosity of resole, cps at 25° C. | 690 | 800 | 120 | ND* | 520 | 490 | ND* | ND* | ND* | 960 |

*not determined

EXAMPLE III

This Example illustrates the preparation of an oxyalkylated resole-furfuryl alcohol prepolymer from a preformed resole, furfuryl alcohol, and propylene oxide.

A mixture of 154 grams of Resole Resin No. 1 of Example I, 203 grams of water and 980 grams of furfuryl alcohol was acidified with aqueous sulfuric acid (30% by weight) to a pH value of 2.5. The reactants were gradually heated to a reaction temperature of 95°-98° C. and maintained at this temperature over a reaction period of 3.5 hours. The polymerization was terminated by addition of sufficient aqueous sodium hydroxide (30% by weight) to raise the pH value of the reaction mixture to 7.5. Thereafter water and some furfuryl alcohol were removed from the reaction mixture under reduced pressure. The yield of resolefurfuryl alcohol prepolymer was 717 grams and the resin had a Brookfield viscosity at 25° C. of 32,800 cps.

The resultant resin in an amount of 537 grams and 2.0 grams of triethylamine were heated in a reaction vessel to a temperature of 100°-125° C., and this temperature was maintained while adding dropwise 28.0 grams of propylene oxide. The reaction mixture was cooled, and the volatiles present were removed by stripping under reduced pressure to yield 538.8 grams of a viscous oxypropylated resolefurfuryl alcohol prepolymer.

EXAMPLE IV

This Example illustrates the preparation of additional oxyalkylated resole-furfuryl alcohol prepolymers from a preformed resole, furfuryl alcohol, and propylene oxide.

A mixture of 154 grams of Resole Resin No. 1 of Example I, 203 grams of water, and 980 grams of furfuryl alcohol (10 moles) was acidified with aqueous sulfuric acid (30% by weight) until a pH value of 2.5 was reached. The resultant reaction mixture was gradually heated to a reaction temperature of 98°-100° C. and was maintained at this temperature over a reaction period of 0.5 hour. The polymerization was terminated at the end of the reaction period by addition of sufficient aqueous sodium hydroxide solution (30% by weight) to increase the pH value of the reaction mixture to 7.5. Thereafter water and some unreacted furfuryl alcohol were removed under reduced pressure. The yield was 806 grams of a resolefurfuryl alcohol resin having a Brookfield viscosity of 198 cps. at 25° C.

The above prepared was admixed in an amount of 403 grams with 2 grams of triethylamine in a reaction vessel and the admixture was gradually heated to 125° C. Propylene oxide in an amount of 31.0 grams was added dropwise over a period of 3 hours while maintaining the temperature at 125° C. Thereafter the resultant reaction mixture was cooled and volatiles were removed by stripping under reduced pressure. The yield of oxypropylated resole-furfuryl alcohol prepolymer was 289 grams and the product was very viscous.

Four additional oxypropylated resole-furfuryl alcohol prepolymers were prepared by reacting 154 grams of the aforementioned resole resin with 980 grams of furfuryl alcohol in 203 grams of water following the above general procedure. The amount of resole and propylene oxide employed and the other experimental details are shown in Table III.

TABLE III

Preparation of Oxypropylated Resole-Furfuryl Alcohol Prepolymers

| | | | | |
|---|---|---|---|---|
| Yield of Resole-FA | 746 | 744 | 730 | 763 |
| Prepolymer, g. | | | | |
| Volatiles, g. | 566 | 564 | 571 | 570 |
| Propylene Oxide, g. | 58 | 58 | 58 | 58 |
| Yield of Oxypropylated Prepolymer, g. | 544 | 527 | 483 | 563 |
| Brookfield Viscosity, cps at 25° C. | 56,800 | 22,800 | 21,200 | 13,600 |
| Volatiles, g. | 235 | 242 | 279 | 231 |

EXAMPLE V

This Example illustrates the preparation of additional oxypropylated resole-furfuryl alcohol prepolymers from certain of the resole resins prepared in Example II. The general procedure of Example IV was followed with the exception of varying the reactants, the reaction temperature, the reaction time, etc. as noted in Table IV.

The experimental details and data thus obtained are recorded hereinafter in Table IV.

TABLE IV

PREPARATION OF OXYPROPYLTED RESOLE-FURFURYL ALCOHOL (RFA) PREPOLYMERS

| RFA Prepolymer | 1 | 2 | 3 | 4 | 5 | 6 | 7 | 8 | 9 | 10 | 11 |
|---|---|---|---|---|---|---|---|---|---|---|---|
| (Table II) | | | | | | | | | | | |
| Formalehyde-phenol ratio | 1.5 | 1.5 | 2.0 | 2.0 | 2.0 | 2.73 | 2.73 | 3 | 3 | 4 | 4.1 |
| Amount of resole, g. | 139 | 348 | 154 | 385 | 77 | 385 | 1235.5 | 92 | 460 | 460 | 184 |
| Furfuryl Alcohol, g. | 980 | 2450 | 980 | 2450 | 490 | 2450 | 6860 | 490 | 2450 | 2450 | 980 |
| Furfuryl Alcohol, moles | 10 | 25 | 10 | 25 | 5 | 25 | 70 | 5 | 25 | 25 | 10 |
| Water, g. | 200 | 500 | 200 | 500 | 100 | 500 | 1400 | 100 | 500 | 500 | 200 |
| Reaction temp., ° C. | 100 | 100 | 100 | 100 | 100 | 100 | 100 | 100 | 100 | 100 | 100 |
| Reaction time, minutes | 60 | 60 | 60 | 60 | 120 | 60 | 120 | 120 | 60 | 60 | 60 |
| Yield RFA prepolymer, g. | 1045 | ND* | 1045 | ND* | 509 | 2492 | 7564 | 534 | ND* | ND* | 1076 |
| Volatiles | 263 | 751 | 283 | 645 | 161 | 745 | 1874 | 149 | 643 | 688 | 283 |
| Propylene oxide, g. | 61 | 152 | 61 | 152 | 31 | 152 | — | 31 | 152 | 152 | 61 |
| Propylene oxide, moles | 1.05 | 2.62 | 1.05 | 2.62 | 0.53 | 2.62 | — | 0.53 | 2.62 | 2.62 | 1.05 |
| Triethylamine, g. | 4 | 10 | 4 | 10 | 2 | 10 | — | 2 | 10 | 10 | 4 |
| Reaction temp., ° C. | 125 | 125 | 125 | 125 | 125 | 125 | — | 125 | 125 | 125 | 125 |
| Reaction time, minutes | 100 | 135 | 130 | 135 | 160 | 180 | — | 160 | 135 | 135 | 135 |
| Oxypropylated RFA, yield, g. | 493 | 1592 | 566 | 1024 | 298 | 1233 | — | 303 | 1228 | 1503 | 599 |
| Volatiles, g. | 622 | 1107 | 538 | 1715 | 242 | 1400 | — | 256 | 1641 | 1363 | 527 |
| Viscosity of resin, cps. at 40° C | 60,000 | 306,000 | 154,000 | 22,200 | 156,000 | 36,100 | | 49,600 | 36,800 | 63,200 | 27,600 |

ND*not determined

EXAMPLE VI

This Example illustrates the preparation of additional oxyalkylated resole-furfuryl alcohol prepolymers from resole-furfuryl alcohol prepolymer No. 7 of Table IV as prepared by Example V. The general procedure of Example V was followed with the exception of carrying out the reaction in an autoclave, using an addition and reaction temperature of 125° C., a reaction time of one hour, and varying the reactants, etc., as noted in Table V.

The experimental details and data thus obtained are recorded in Table V.

TABLE V

AUTOCLAVE OXYPROPYLATION OF RFA PREPOLYMER

| | | | | | |
|---|---|---|---|---|---|
| RFA prepolymer No. 7 (Table IV), g. | 1080 | | 1080 | | 1080 |
| Triethylamine, g. | 4 | | 4 | | 4 |
| Propylene oxide, g. | 61 | (1.05 mole) | 122 | (2.1 moles) | 174 (3.0 moles) |
| Addn. time, hours | 1 | | 2 | | 3 |
| Yield of Oxypropylated RFA prepolymer, g. | 563 | | 588 | | 637 |
| Volatiles, g. | 520 | | 572 | | 591 |
| Feed, g. | 1145 | 1206 | 1252 | | |
| Recovery, g. | 1083 | 1160 | 1228 | | |
| Oxypropylated RFA prepolymer Viscosity, cps. at 40° C. | 106,000 | | 120,000 | | 26,400 |
| Oxypropylated RFA prepolymer No. | 1 | | 2 | | 3 |

EXAMPLE VII

This Example illustrates the preparation of additional oxypropylated phenol-formaldehyde-furfuryl alcohol prepolymers.

In Stage I, a reaction vessel was charged with 94.0 g. of phenol (1.0 mole), 162.2 grams of formalin containing 37% by weight of formaldehyde (2 moles), 980.0 grams of furfuryl alcohol (10 moles), and 101 grams of water. The pH value of the reactants was adjusted to 2.5 by addition of aqueous sulfuric acid (30% by weight). The reaction mixture gradually was heated to a reaction temperature of 93°-95° C. and this temperature was maintained over a reaction period of 3 hours. Thereafter the pH value of the reaction mixture was adjusted to 7.5 by addition of aqueous sodium hydroxide solution (30% by weight).

The reaction mixture separated into an aqueous layer (105 grams) which was withdrawn. The volatiles in the organic layer were stripped under reduced pressure to a final pot temperature of 60° C. at 0.2 Torr. The yield of phenol-formaldehyde-furfuryl alcohol prepolymer was 754.6 grams.

Triethylamine in an amount of 2.0 grams was added to the resultant resin and the admixture was heated to 100° C. Propylene oxide in an amount of 128.0 grams (2.2 moles) was added dropwise over a period of 8 hours. After heating at 110° C. for an additional hour, the volatiles were stripped under reduced pressure to a final pot temperature of 60° C. at 1 Torr. to yield 825.5 grams of oxypropylated phenol-formaldehyde-furfuryl alcohol (PFFA) prepolymer.

The above general procedure was followed in three additional runs with the exception of varying the reactants, reaction time, reaction temperature, etc. as noted in Table VI. The experimental details and data thus obtained are recorded hereinafter in Table VI.

was adjusted to 2.5 by addition of aqueous sulfuric acid (30% by weight). The reaction mixture was gradually heated to a reaction temperature of 100° C., and was maintained at this temperature over a reaction period of 2 hours. Thereafter, the reaction mixture was neutralized to a pH value of 7.5 by addition of sodium hydroxide solution (30% by weight). Water and some unreacted furfuryl alcohol was removed from the reaction mixture under reduced pressure. The yields of phenol-formaldehyde-furfuryl alcohol (PFFA) prepolymers

TABLE VI
PREPARATION OF OXYPROPYLATED PHENOL-FORMALDEHYDE-FURFURYL ALCOHOL PREPOLYMERS

| PFFA Prepolymer | 2 | 4 | 4 |
|---|---|---|---|
| Formaldehyde, moles | 2 | 4 | none |
| Water, g. | 101 | 101 | 101 |
| pH of Reaction | 2.5 | 2.5 | 2.0 |
| Reaction Temperature, ° C. | 93–5 | 97–8 | 92–6 |
| Yield of PFFA Prepolymer | 758 | 441 | 666 |
| Volatiles, g. | 562 | 863 | 676 |
| OXYPROPYLATED PFFA Prepolymer | | | |
| Propylene Oxide, g. | 128 | 64 | 64 |
| Propylene Oxide, moles | 2.2 | 1.1 | 1.1 |
| Reaction Time, hr. | 8 | 8 | 7 |
| Reaction Temperature, ° C. | 100–120 | 100–110 | 100–110 |
| Yield of Oxypropylated PFFA Prepolymer, g. | 777 | 460 | 675 |
| Brookfield Viscosity at 25° C., cps. | 38,500 | 13,000 | very viscous |
| Volatiles, g. | 53 | 26 | 26 |

EXAMPLE VIII

This Example illustrates the preparation of oxypropylated phenol-formaldehyde-furfuryl alcohol (PFFA) prepolymers by reacting the phenol and formaldehyde under alkaline conditions in a first stage, adding furfuryl alcohol to the reaction mixture and continuing the reaction under acidic conditions in a second stage, and thereafter oxypropylating the resultant resin in a third stage.

In the first stage, the indicated amounts of formaldehyde (37% aqueous solution) and 94 grams of phenol (1 mole) were added to a reaction vessel and the pH value was adjusted to 8.5–9 by addition of an aqueous sodium hydroxide solution (30% by weight). The reaction mixture was gradually heated to a reaction temperature of 90° C., and this temperature and a pH value of 8.5–9 were maintained over a reaction period of 2 hours. Thereafter, the reaction mixture was cooled to 40° C.

In the second stage, 980 grams of furfuryl alcohol (10 moles) was added. The pH value of the reaction mixture and the volatiles removed were as indicated in Table VII.

In the third stage, the indicated amount of triethylamine was added to the PFFA resins prepared in the second stage and the temperature was raised to the indicated reaction temperature. The propylene oxide was added thereto dropwise over the reaction period. Thereafter, the reaction mixture was cooled and the volatiles were removed under reduced pressure. The yields of oxypropylated PFFA prepolymers and the viscosities thereof were as indicated in Table VII.

The experimental details for each stage and the data thus obtained are recorded in Table VII.

TABLE VII
PREPARATION OF OXYPROPYLATED PHENOL-FORMALDEHYDE-FURFURYL ALCOHOL (PFFA) PREPOLYMERS

| PFFA Prepolymer No. | 1 | 2 | 3 | 4 | 5 |
|---|---|---|---|---|---|
| Stage I | | | | | |
| Formaldehyde (37%), g. | 162 | 324 | 324 | 324 | 486 |
| Formaldehyde, moles | 2 | 4 | 4 | 4 | 6 |
| Formaldehyde - phenol ratio | 2 | 4 | 4 | 4 | 6 |
| Stage II | | | | | |
| Reaction time, minutes | 240 | 60 | 60 | 60 | 120 |
| Yield of PFFA resin, g. | 825 | 1111 | 1110 | — | — |
| Volatiles, g. | 379 | 272 | 283 | 530 | 668 |
| Stage III | | | | | |
| Propylene oxide, g. | 183 | 61 | 183 | 149 | 126.4 |
| Propylene oxide, moles | 3.2 | 1.1 | 3.2 | 2.6 | 2.2 |
| Triethylamine, g. | 8.3 | 4 | 4 | 8.1 | 8.2 |
| Reaction temp., ° C. | 125 | 125 | 125 | 100 | 100 |
| Reaction time, minutes | 180 | 120 | 330 | 240 | 240 |
| Yield of oxypropylated PFFA, g. | 402 | 610 | 571 | 455 | 591 |
| Volatiles, g. | 612 | 549 | 703 | 481 | 330 |
| Viscosity of resin, cps. at 40° C | 174,000 | 70,000 | 368,000 | 192,000 | 340,000 |

EXAMPLE IX

This Example illustrates the preparation of oxyethylated Resole-Furfuryl Alcohol (RFA) prepolymers from selected phenolformaldehyde resole resins having a formaldehyde-phenol ratio of 2.73 prepared in accordance with Examples I and II (See Table II). The general procedure of Example IV was followed with the exception of substituting the ethylene oxide of this Example for the propylene oxide of Example IV, using a Stage I reaction temperature of 100° C., and otherwise varying the reactants, the reaction temperature, the reaction time, etc., as noted in Table VIII.

The experimental details and data thus obtained are recorded hereinafter in Table VIII.

intense mixing for approximately 30 seconds at a temperature varying between 25° C. and 44° C., foaming occurred and the foam was allowed to cure at room temperature.

After setting for approximately two days, the cured foam was tested by conventional prior art techniques, i.e., the ASTM or NBS procedures identified hereinbefore, to determine the density in pounds per cubic foot, the percent of closed cells (corrected) in the cellular

TABLE VIII

PREPARATION OF OXYETHYLATED RESOLE-FURFURYL ALCOHOL (RFA) PREPOLYMERS

| Oxyethylated RFA Prepolymers No. | 1 | 2 | 3 | 4 | 5 |
|---|---|---|---|---|---|
| Stage I | | | | | |
| Resole Resin of Table II | No. 4 | No. 4 | No. 3 | No. 5 | No. 5 |
| Amount of resole, g | 1235.5 | 1235.5 | 154 | 154 | 154 |
| Furfuryl alcohol, g | 6860 | 6864 | 980 | 980 | 980 |
| Furfuryl alcohol, moles | 70 | 70 | 10 | 10 | 10 |
| Water, g. | 1400 | 1400 | 203 | 203 | 203 |
| Reaction time, minutes | 120 | 120 | 60 | 60 | 60 |
| RFA resin, g. | 7564* | 7564* | 747 | 496 | 521 |
| Volatiles, g. | 1874 | 1874 | 568 | 811 | 796 |
| Stage II | | | | | |
| Ethylene oxide, g. | 48 | 96 | 44 | 44 | 44 |
| Ethylene oxide, moles | 1.1 | 2.2 | 1 | 1 | 1 |
| Triethylamine, g. | 4 | 4 | 2 | — | , |
| Reaction temp. ° C. | 100 | 100 | 125 | 100 | 200 |
| Reaction time, minutes | 135 | 185 | 185 | 140 | 80 |
| Oxyethylated RFA, g. | 566 | 578 | 516 | 488 | 520 |
| Volatiles g. | 551 | 564 | 249 | 23 | 4 |
| Viscosity of resin, cps. at 40° C. | 65,600 | 52,800 | very viscous | 304,000 | 51,000 |

*1080 g. of the RFA resin was used to prepare the oxyethylated RFA prepolymer

EXAMPLE X

This Example illustrates the preparation of cellular polymers, referred to in this and subsequent examples as foams, from oxypropylated resole-furfuryl alcohol (RFA) prepolymers. The prepolymers were selected from Table IV and were prepared in accordance with Example V.

The selected RFA prepolymer, surfactant, inert filler or flame retardant, fluorocarbon blowing agent and polyisocyanate were blended together in a high speed blender in the amounts noted in Table IX. Thereafter, simultaneously an admixture of an amine polyol and a catalyst blend was added thereto via a syringe. After structure, the compressive strength (10% deflection) in pounds per square inch, the friability as a function of percent weight loss, the flame height in inches, the weight retention in percent, and the visual estimate of smoke as determined by the Butler Chimney Test, the smoke density $D_m$ as determined by the National Bureau of Standards Test Procedure, and the oxygen index. The experimental details and data thus obtained are recorded hereinafter in Table IX. In the data for the visual estimate of smoke, "lt.", "med." and "v.lt." refer to light, medium and very light, respectively, in Table IX and in all subsequent tables where these abbreviations appear.

TABLE IX (a)

PROPERTIES OF FOAMS FROM OXYPROPYLATED RFA PREPOLYMERS WITH ACID CATALYST

| Foam No. | 1 | 2 | 3 | 4 | 5 | 6 | 7 | 8 | 9 |
|---|---|---|---|---|---|---|---|---|---|
| Oxypropylated RFA Prepolymer | | | | | | | | | |
| Table IV, No. 2 | 100 | — | — | — | — | — | — | — | — |
| Table IV, No. 1 | — | 50 | 50 | — | — | — | — | — | — |
| Table IV, No. 5 | — | — | — | 50 | — | — | — | — | — |
| Table IV, No. 4 | — | — | — | — | 100 | — | — | — | — |
| Table V, No. 1 | — | — | — | — | — | 50 | — | — | — |
| Table IV, No. 6 | — | — | — | — | — | — | 50 | 50 | 50 |
| Formalehyde/phenol, ratio | 1.5 | 1.5 | 1.5 | 2.0 | 2.0 | 2.73 | 2.73 | 2.73 | 2.73 |
| DC-193, g. | 2 | 1 | 1 | 1 | 2 | 1 | 1 | 1 | 1 |
| FREON 113, g. | 35 | 15 | 15 | 15 | 35 | 15 | 15 | 15 | 12 |
| PAPI, g. | 50 | 25 | 35 | 25 | 50 | 25 | 25 | 25 | 25 |
| Diammonium phosphate, g. | 20 | 10 | 10 | 10 | 20 | 10 | — | 10 | — |
| Ethyl Acid Phosphate, g. | 20 | 10 | 10 | 10 | 20 | 10 | 10 | 10 | 10 |
| THANOL R-350 X, g. | 10 | 5 | 5 | 5 | 10 | 5 | — | — | 5 |
| Dibutyltin diacetate, g. | 0.4 | 0.2 | 0.2 | 0.2 | 0.4 | 0.2 | 0.2 | 0.2 | 0.2 |
| Temp. of Initiation, ° C. | 44 | 40 | 40 | 42 | — | 44 | 25 | 25 | 25 |
| Density, pcf. | 1.5 | 1.8 | 1.3 | 2.3 | 1.5 | 1.5 | 0.7 | 1.1 | 1.1 |
| Closed cell, corr., % | 104 | 102 | 94 | 84 | 53 | 85 | 49 | 49 | 85 |
| Compr. Str., 10% defl, psi | 8 | 11 | 10 | 11 | 4 | 12 | — | 6 | 5 |
| Friab., % wt. loss | 29 | — | — | — | 99 | — | 57 | 49 | 35 |
| Butler wt. retained, % | 91 | 92 | 89 | 94 | 91 | 92 | 91 | 93 | 87 |
| Flame ht., inches | 4 | 4 | 7 | 6 | 4 | 3 | 8 | 5 | 9 |
| Smoke, visual estimate | — | lt. | lt. | med. | — | — | v.lt | v.lt | v.lt |
| NBS $D_m$ | 51 | — | ' | — | 46 | — | — | — | — |

TABLE IX (a)-continued
PROPERTIES OF FOAMS FROM OXYPROPYLATED RFA PREPOLYMERS WITH ACID CATALYST

| Foam No. | 1 | 2 | 3 | 4 | 5 | 6 | 7 | 8 | 9 |
|---|---|---|---|---|---|---|---|---|---|
| Oxygen index | — | — | — | — | — | 34 | — | — | — |

TABLE IX - (b)
PROPERTIES OF FOAMS FROM OXYPROPYLATED RFA PREPOLYMERS WITH ACID CATALYST

| Foam No. | 10 | 11 | 12 | 13 | 14 | 15 | 16 | 17 |
|---|---|---|---|---|---|---|---|---|
| Oxypropylated RFA Prepolymer | | | | | | | | |
| Table IV, No. 6 | 50 | 50 | 50 | — | — | — | — | — |
| Table IV, No. 8 | — | — | — | 50 | — | — | — | — |
| Table IV, No. 9 | — | — | — | — | 150 | — | — | — |
| Table IV, No. 10 | — | — | — | — | — | 100 | — | — |
| Table IV, No. 11 | — | — | — | — | — | — | 50 | 50 |
| Formaldehyde/phenol, ratio | 2.73 | 2.73 | 2.73 | 3.0 | 3.0 | 4.0 | 4.1 | 4.1 |
| DC-193, g. | 1 | 1 | 1 | 1 | 3 | 2 | 1 | 1 |
| FREON 113, g. | 15 | 15 | 12 | 15 | 45 | 35 | 15 | 15 |
| PAPI, g. | 25 | 25 | 25 | 25 | 75 | 50 | 25 | 25 |
| Diammonium phosphate, g. | 10 | 10 | — | 10 | 30 | 20 | 10 | 10 |
| Ethyl Acid Phosphate, g. | 5 | 10 | 10 | 10 | 30 | 20 | 10 | 10 |
| THANOL R-350 X, g. | 5 | 5 | 5 | 5 | 15 | 10 | 5 | 5 |
| Dibutyltin diacetate, g. | 0.2 | 0.2 | 0.2 | 0.2 | 0.6 | 0.4 | 0.2 | 0.2 |
| Temp. of Initiation, °C. | 25 | 25 | 25 | 42 | 42 | 44 | 25 | 25 |
| Density, pcf. | 2.4 | 1.9 | 2.0 | 2.1 | 1.7 | 1.4 | 1.0 | 1.3 |
| Closed cell, corr., % | 98 | 100 | 91 | 103 | 49 | 47 | 92 | 79 |
| Compr. Str., 10% defl., psi. | — | 9 | 6 | 10 | — | — | 6 | 9 |
| Friab., % wt. loss | 74 | 35 | 27 | — | 67 | 45 | — | — |
| Butler wt. retained, % | 93 | 93 | 87 | 93 | 92 | 93 | 96 | — |
| Flame ht., inches | 10 | 8 | 9 | 5 | 4 | 5 | 7 | 5 |
| Smoke, visual estimate | v.lt | v.lt | med. | lt. | — | — | v.lt | v.lt |
| NBS, $D_m$ | — | — | — | — | 47 | 59 | — | — |

EXAMPLE XI

This Example illustrates the preparation of foams from selected oxypropylated resole-furfuryl alcohol prepolymers of Tables IV and V prepared in accordance with the procedures of Examples V and VI. The foams were prepared in the absence of an added catalyst.

The foam formulations for foams 1-7 of this Example omitted the ethyl acid phosphate, dibutyltin diacetate, and Thanol R-350 X of the formulations of Example X. The foam formulation for Foam 8 of this Example omitted the ethyl acid phosphate and substituted Polyol A for Thanol R-350 X of the formulations of Example X. The selected oxypropylated resole-furfuryl alcohol prepolymers, foam stabilizer, fluorocarbon blowing agent and polyisocyanate were admixed with a high speed stirrer. The foaming occurred within approximately 30 seconds and the foams were allowed to cure at room temperature. The temperature of initiation varied between 25° C. and 44° C.

After setting for approximately 2 days at room temperature, the properties of the cured foam were tested by conventional prior art techniques, i.e., the ASTM or NBS procedures previously identified, to determine the density in pounds per cubic foot, the percent of closed cells (corrected) in the cellular structure, the compressive strength (10% deflection) in pounds per square inch, the friability as a function of percent weight loss, the smoke density $D_m$ as determined by the National Bureau of Standards Test, and the flame height in inches, weight percent retained, time to self extinguish in seconds, and the visual estimate of the smoke as determined by the Butler Chimney Test.

The experimental details and data thus obtained are recorded hereinafter in Table X.

TABLE X
PROPERTIES OF FOAMS FROM OXYPROPYLATED RFA PREPOLYMERS WITHOUT ADDED CATALYST

| Foam No. | 1 | 2 | 3 | 4 | 5 | 6 | 7 | 8* |
|---|---|---|---|---|---|---|---|---|
| Oxypropylated RFA Prepolymer | | | | | | | | |
| Table IV, No. 2 | 100 | — | — | — | — | — | — | — |
| Table IV, No. 6 | — | 50 | — | — | — | — | — | — |
| Table IV, No. 6 | — | — | 50 | — | — | — | — | — |
| Table V, No. 1 | — | — | — | 50 | — | — | — | — |
| Table V, No. 2 | — | — | — | — | 50 | — | — | — |
| Table V, No. 3 | — | — | — | — | — | 50 | — | — |
| Table IV, No. 8 | — | — | — | — | — | — | 50 | — |
| Table IV, No. 11 | — | — | — | — | — | — | — | 50 |
| Formaldehyde-phenol, ratio | 1.5 | 2.73 | 2.73 | 2.73 | 2.73 | 2.73 | 3 | 4.1 |
| DC-193, g. | 2 | 1 | 1 | 1 | 1 | 1 | 1 | 1 |
| FREON 113, g. | 35 | 15 | 15 | 15 | 15 | 15 | 15 | 15 |
| PAPI, g. | 50 | 25 | 25 | 25 | 25 | 35 | 25 | 45 |
| Diammonium phosphate, g. | 20 | 10 | 10 | 10 | 10 | 10 | 10 | 20 |
| Polyol A, g. | — | — | — | — | — | — | — | 5 |
| Temp. of initiation, °C. | 44 | 25 | 25 | 44 | 42 | — | 42 | 25 |
| Density, pcf. | 1.9 | 2.5 | 2.6 | 2.4 | 2.4 | 2.6 | 2.6 | 3.3 |
| Closed cell, corr.,% | 94 | 100 | 103 | 104 | 104 | 104 | 104 | 96 |
| Compr. Str., psi., 10% defl. | 14 | — | — | 19 | 20 | 25 | 13 | 32 |
| Friability, % wt. loss | 51 | 33 | 39 | — | 10 | 31 | — | — |
| Butler Chimney Test | | | | | | | | |

TABLE X-continued
PROPERTIES OF FOAMS FROM OXYPROPYLATED RFA PREPOLYMERS WITHOUT ADDED CATALYST

| Foam No. | 1 | 2 | 3 | 4 | 5 | 6 | 7 | 8* |
|---|---|---|---|---|---|---|---|---|
| wt. retained, % | 89 | 90 | 88 | 93 | 94 | 91 | 93 | 93 |
| Flame ht., inches | 6 | 10+ | 10 | 7 | 5 | 5 | 10 | 10 |
| Time to SX, seconds | 10 | 11 | 10 | 10 | 10 | 10 | 10 | 10 |
| Smoke, visual estimate | — | lt. | lt. | — | — | — | med. | lt. |
| NBS, Smoke Density $D_m$ | 98 | — | — | — | — | — | — | — |

*The formulation also contains 0.5 g. DBTDA

EXAMPLE XII

This Example illustrates the preparation of foams from oxyethylated resole-furfuryl alcohol (RFA) prepolymers selected from Table VIII and prepared in accordance with Example IX. The general procedure of this Example was the same as that of Example X except as noted in Table XI.

The experimental details and data thus obtained are recorded hereinafter in Table XI.

EXAMPLE XIII

This Example illustrates the preparation of foams from oxypropylated PFFA prepolymers selected from Table VII and prepared in accordance with Example VIII. The general procedure of this Example was the same as that noted in Example X with the exception of substituting the selected oxypropylated PFFA prepolymers used in this Example for the oxypropylated RFA prepolymers used in Example X. The foams were prepared in the presence of an acid catalyst.

The experimental details and data thus obtained are recorded hereinafter in Table XII.

TABLE XI
PROPERTIES OF FOAMS FROM OXYETHYLATED RFA PREPOLYMERS

| Foam No.* | 1 | 2 | 3 | 4 | 5 | 6 | 7 | 8 | 9 |
|---|---|---|---|---|---|---|---|---|---|
| Oxyethylated RFA Prepolymer from Table VIII | | | | | | | | | |
| No. 3 | 50 | 50 | 50 | — | — | — | — | — | — |
| No. 4 | — | — | — | 50 | 50 | — | — | — | — |
| No. 5 | — | — | — | — | — | 50 | — | — | — |
| No. 1 | — | — | — | — | — | — | 50 | 50 | — |
| No. 2 | — | — | — | — | — | — | — | — | 50 |
| PAPI, g. | 25 | 25 | 25 | 25 | 25 | 25 | 25 | 25 | 25 |
| F-113, g. | 12 | 12 | 12 | 15 | 15 | 15 | 15 | 15 | 15 |
| Diammonium phosphate, g. | — | — | — | 10 | — | 10 | 10 | 10 | 10 |
| THANOL Polyol R-350 X, g. | 5 | 5 | 5 | 5 | 5 | 5 | 5 | 5 | 5 |
| Ethyl Acid Phosphate, g | 10 | 10 | 10 | 10 | 10 | 10 | 10 | 10 | 10 |
| DBTDA, g. | — | 0.2 | 0.5 | 0.2 | 0.2 | 0.2 | 0.2 | 0.2 | 0.2 |
| DC-193, g. | 0.5 | 0.5 | 0.5 | 1 | 1 | 1 | 1 | 1 | 1 |
| Density, pcf. | 1.1 | 1.2 | 1.4 | 2.5 | 1.0 | 2.0 | 2.1 | 2.3 | 4.7 |
| Compressive strength, psi. | 7 | 8 | 8 | 8 | 4 | 6 | 8 | 6 | 12 |
| Closed cell, corr., % | 82 | 82 | 42 | 73 | 43 | 102 | 114 | 92 | 98 |
| Butler Chimney test: | | | | | | | | | |
| wt. ret., % | 90 | 90 | 90 | 93 | 90 | 91 | 94 | 95 | 96 |
| flame ht., inches | 6 | 10 | 10 | 7 | 10 | 7 | 8 | 6 | 6 |
| time to SX, seconds | 10 | 10 | 10 | 10 | 10 | 10 | 10 | 10 | 10 |

*Foam No. 1 was post-cured for 10 min at 80° C; foams No. 2-9 were post-cured at 50° C. for 1 hour.

TABLE XII
PROPERTIES OF FOAMS FROM OXYPROPYLATED PFFA PREPOLYMERS WITH ACID CATALYST

| Foam No. | 1 | 2 | 3 | 4 | 5 | 6 | 7 |
|---|---|---|---|---|---|---|---|
| Oxypropylated PFFA Prepolymer From Table VII | | | | | | | |
| No. 1 | 50 | — | — | — | — | — | — |
| No. 2 | — | 50 | 50 | — | — | — | — |
| No. 3 | — | — | — | 50 | 50 | 50 | — |
| No. 4 | — | — | — | — | — | — | 50 |
| Formaldehyde/phenol, ratio | 2 | 4 | 4 | 4 | 4 | 4 | 4 |
| Propylene Oxide reacted, moles | 3 | 1 | 1 | 3 | 3 | 3 | 2.6 |
| DC-193, g. | 1 | 1 | 1 | 1 | 1 | 1 | 1 |
| FREON 113, g. | 15 | 15 | 15 | 15 | 15 | 15 | 15 |
| Diammonium phosphate, g. | 10 | 10 | 10 | 10 | 10 | 10 | 10 |
| PAPI, g. | 25 | 25 | 25 | 25 | 25 | 25 | 25 |
| Ethyl acid phosphate, g. | 10 | 10 | 10 | 10 | 10 | 10 | 10 |
| DBTDA, g. | 0.2 | 0.2 | 0.2 | 0.2 | 0.2* | 0.2 | 0.2 |
| THANOL Polyol R-350 X, g. | 5 | 5 | 5 | 5 | 5 | 5** | 5 |
| Initiation temp., ° C. | | 25 | 45 | 43 | 44 | 44 | |
| Density, pcf. | 2.3 | 1.4 | 1.3 | 1.5 | 1.4 | 2.2 | 2.0 |
| Closed cells, corr., % | 106 | 53 | 96 | 103 | 101 | 108 | 83 |
| K factor, initial | 0.124 | — | — | — | — | — | — |
| Compressive str., 10% defl., psi, | 16 | 8 | 8 | 12 | 10 | 12 | 10 |
| Butler Chimney test | | | | | | | |
| wt. retained, % | 91 | 91 | 90 | 92 | 95 | 95 | 90 |
| flame ht., inches | 8 | 5 | 8 | 4 | 6 | 5 | 7 |

TABLE XII-continued

PROPERTIES OF FOAMS FROM OXYPROPYLATED PFFA PREPOLYMERS WITH ACID CATALYST

| Foam No. | 1 | 2 | 3 | 4 | 5 | 6 | 7 |
|---|---|---|---|---|---|---|---|
| Smoke, visual estimate | — | lt. | lt. | med. | med. | med. | — |

*Stannous octoate used instead of DBTDA
**TKEA used instead of THANOL Polyol R-350X

EXAMPLE XIV

This Example illustrates the preparation of foams from oxypropylated PFFA prepolymers selected from Table VII and prepared in accordance with Example VIII. The formulation did not contain an added catalyst and the general procedure of this Example was the same as that of Example XI with the exception of substituting the oxypropylated PFFA prepolymers of this Example for the oxypropylated RFA prepolymers of Example XI.

The experimental details and data thus obtained are recorded hereinafter in Table XIII.

TABLE XIII

PROPERTIES OF FOAMS FROM OXYPROPYLATED PFFA PREPOLYMERS WITHOUT ADDED CATALYST

| Foam No. | 1 | 2 | 3 |
|---|---|---|---|
| Oxypropylated PFFA Prepolymer From Table VII | | | |
| No. 1 | 50 | — | — |
| No. 2 | — | 50 | — |
| No. 3 | — | — | 50 |
| Formaldehyde/Phenol ratio | 2 | 4 | 4 |
| Propylene Oxide reacted, moles | 3.2 | 1 | 3.2 |
| DC-193, g. | 1 | 1 | 1 |
| FREON 113, g. | 15 | 15 | 15 |
| Diammonium Phosphate, g. | 10 | 10 | 10 |
| PAPI, g. | 25 | 25 | 25 |
| Foam Initiation Temp., ° C. | 44 | 42 | 43 |
| Density, pcf. | 3.0 | 2.6 | 2.4 |
| Closed cells, corr. % | 104 | 93 | 106 |
| Compressive STr., psi., 10% defl. | 33 | 25 | 27 |
| Butler Chimney test: | | | |
| wt. retained,% | 92 | 90 | 90 |
| flame ht., inches | 10 | 10 | 10 |
| Smoke, visual estimate | x | med. | med. |

The foregoing Examples are illustrative of presently preferred processes for preparing foams from the oxyalkylated polyol prepolymer of the invention and an organic polyisocyanate. Other general procedures and processes useful in preparing modified foams may be similar to those disclosed in U.S. Pat. No. 2,608,536, 3,389,094, 3,470,118, 3,682,845, 3,686,101, 3,770,671 and 3,872,034, the disclosures of which are incorporated herein by reference. Unmodified foams may be prepared from the oxyalkylated polyol prepolymers of the invention by the general processes of Examples X-XIII upon omitting the polyisocyanate, THANOL polyol R-350X, polyol A and DBTDA from the formulations. Other acid catalysts and processes useful in preparing foams or solid cured products may be similar to those disclosed in U.S. Pat. No. 3,471,631, 3,299,167, 3,312,650, 3,390,107, 3,567,662, 3,692,706 and 3,725,333, the disclosures of which are incorporated herein by reference. Still additional processes and conditions useful in preparing solid cured products and foams may be similar to those disclosed in the text *Plastic Foams*, edited by Frisch, et al, Marcel Dekker, Inc., New York, New York, the disclosure of which is incorporated herein by reference. In many instances, the curing catalysts and/or curing conditions for use in preparing a solid product or solid polyisocyanate modified product may be substantially the same as those used in preparing the corresponding cellular polymer with the exception of omitting the foaming or frothing agent, or omitting other ingredients and/or conditions which are responsible for the formation of the cellular structure.

We claim:

1. A reactive liquid oxyalkylated polyol prepolymer which may be cured to produce a rigid interpolymer, the said oxyalkylated polyol prepolymer comprising at least three interpolymerized monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1-8 carbon atoms which is interpolymerizable with the said hydroxy aromatic compound, and (c) furfuryl alcohol and being oxyalkylated with about 1-10 moles of an alkylene oxide containing about 2-4 carbon atoms, the said oxyalkylated polyol prepolymer having a viscosity of about 1000-500,000 centipoises at 25° C. and containing about 1.1-6 moles of interpolymerized aldehyde and about 3.1-15 moles of interpolymerized furfuryl alcohol for each mole of the hydroxy aromatic compound interpolymerized therewith.

2. The oxyalkylated polyol prepolymer of claim 1 wherein about 1.5-3 moles of the said aldehyde and about 3.1-8 moles of furfuryl alcohol are interpolymerized with each mole of the said hydroxy aromatic compound.

3. The oxyalkylated polyol prepolymer of claim 1 wherein about 1-10 moles of unpolymerized furfuryl alcohol are present for each mole of the said interpolymerized hydroxy aromatic compound.

4. The oxyalkylated polyol prepolymer of claim 1 wherein the said hydroxy aromatic compound is phenol and the said aldehyde is formaldehyde.

5. The oxyalkylated polyol prepolymer of claim 4 wherein about 1.1-3 moles of formaldehyde and about 3.1-8 moles of furfuryl alcohol are interpolymerized with each mole of phenol, and the resultant polyol prepolymer is oxyalkylated with about 1-3 moles of an alkylene oxide selected from the group consisting of ethylene oxide and propylene oxide.

6. The oxyalkylated polyol prepolymer of claim 4 wherein about 1-10 moles of unpolymerized furfuryl alcohol are present for each mole of interpolymerized phenol.

7. The oxyalkylated polyol prepolymer of claim 6 wherein about 1.5-3 moles of formaldehyde and about 3.1-8 moles of furfuryl alcohol are interpolymerized with each mole of phenol, the resultant polyol prepolymer is oxyalkylated with about 1-3 moles of an alkylene oxide selected from the group consisting of ethylene oxide and propylene oxide and about 3-8 moles of unpolymerized furfuryl alcohol are present for each mole of interpolymerized phenol.

8. A hardened interpolymer prepared by curing a reactive liquid oxyalkylated polyol prepolymer in the presence of an acid catalyst, the said oxyalkylated polyol prepolymer comprising at least three interpolymerized monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1-8 carbon atoms which is interpolymerizable with the said hydroxy aromatic compound, and (c) furfuryl alcohol and being oxyalkylated with about 1-10 moles of an alkylene oxide containing about 2-4 carbon atoms, the said oxyalkylated polyol prepolymer having a viscosity of about 1000-500,000 centipoises at 25° C. and containing about 1.1-6 moles of interpolymerized aldehyde and about 3.1-15 moles of interpolymerized furfuryl alcohol for each mole of the hydroxy aromatic compound interpolymerized therewith.

9. The hardened interpolymer of claim 8 wherein the said prepolymer has about 1.5-3 moles of the said aldehyde and about 3.1-8 moles of furfuryl alcohol interpolymerized with each mole of the said hydroxy aromatic compound.

10. The hardened interpolymer of claim 8 wherein the liquid prepolymer to be cured has present therein about 1-10 moles of unpolymerized furfuryl alcohol for each mole of the said interpolymerized hydroxy aromatic compound, and the said unpolymerized furfuryl alcohol is cured with the said liquid prepolymer.

11. The hardened interpolymer of claim 8 wherein the said hydroxy aromatic compound is phenol and the said aldehyde is formaldehyde.

12. The hardened interpolymer of claim 11 wherein the said prepolymer has about 1.1-3 moles of formaldehyde and about 3.1-8 moles of furfuryl alcohol interpolymerized with each mole of phenol, and the resultant prepolymer is oxyalkylated with about 1-3 moles of an alkylene oxide selected from the group consisting of ethylene oxide and propylene oxide.

13. The hardened interpolymer of claim 11 wherein the said liquid prepolymer to be cured has present therein about 1-10 moles of unpolymerized furfuryl alcohol for each mole of interpolymerized phenol, and the said unpolymerized furfuryl alcohol is cured with the said liquid prepolymer.

14. The hardened interpolymer of claim 13 wherein the said prepolymer has about 1.5-3 moles of formaldehyde and about 3.1-8 moles of furfuryl alcohol interpolymerized with each mole of phenol, the resultant prepolymer is oxyalkylated with about 1-3 moles of an alkylene oxide selected from the group consisting of ethylene oxide and propylene oxide and about 3-8 moles of unpolymerized furfuryl alcohol are present for each mole of interpolymerized phenol.

15. A rigid cellular interpolymer prepared by curing a reactive liquid oxyalkylated polyol prepolymer in the presence of a foaming agent and an acid catalyst, the said oxyalkylated polyol prepolymer comprising at least three interpolymerized monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1-8 carbon atoms which is interpolymerizable with the said hydroxy aromatic compound, and (c) furfuryl alcohol and being oxyalkylated with about 1-10 moles of an alkylene oxide containing about 2-4 carbon atoms, the said oxyalkylated polyol prepolymer having a viscosity of about 1000-500,000 centipoises at 25° C. and containing about 1.1-6 moles of interpolymerized aldehyde and about 3.1-15 moles of interpolymerized furfuryl alcohol for each mole of the hydroxy aromatic compound interpolymerized therewith.

16. The cellular interpolymer of claim 15 wherein the said prepolymer has about 1.5-3 moles of the said aldehyde and about 3.1-8 moles of furfuryl alcohol interpolymerized with each mole of the said hydroxy aromatic compound.

17. The cellular interpolymer of claim 15 wherein the said liquid prepolymer to be cured has present therein about 1-10 moles of unpolymerized furfuryl alcohol for each mole of the said interpolymerized hydroxy aromatic compound, and the said unpolymerized furfuryl alcohol is cured with the said liquid prepolymer.

18. The cellular interpolymer of claim 15 wherein the said prepolymer contains less than 1% by weight of unpolymerized furfuryl alcohol whereby the resultant cellular interpolymer has a predominantly closed cell structure.

19. The cellular interpolymer of claim 15 wherein the said hydroxy aromatic compound is phenol and the said aldehyde is formaldehyde.

20. The cellular interpolymer of claim 19 wherein the said prepolymer has about 1.1-3 moles of formaldehyde and about 3.1-8 moles of furfuryl alcohol interpolymerized with each mole of phenol, and the resultant prepolymer is oxyalkylated with about 1-3 moles of an alkylene oxide selected from the group consisting of ethylene oxide and propylene oxide.

21. The cellular interpolymer of claim 19 wherein the said liquid prepolymer to be cured has present therein about 1-10 moles of unpolymerized furfuryl alcohol for each mole of interpolymerized phenol, and the said unpolymerized furfuryl alcohol is cured with the said liquid prepolymer.

22. The cellular interpolymer of claim 21 wherein the said prepolymer has about 1.1-3 moles of formaldehyde and about 3.1-8 moles of furfuryl alcohol interpolymerized with each mole of phenol, the resultant prepolymer is oxyalkylated with about 1-3 moles of an alkylene oxide selected from the group consisting of etyylene oxide and propylene oxide, and about 3-8 moles of unpolymerized furfuryl alcohol are present for each mole of interpolymerized phenol.

23. The cellular interpolymer of claim 19 wherein the said prepolymer contains less than 1% by weight of unpolymerized furfuryl alcohol whereby the resultant cellular interpolymer contains at least 85% of closed cells.

24. The cellular interpolymer of claim 23 wherein the said prepolymer has about 1.5-3 moles of formaldehyde and about 3.1-8 moles of furfuryl alcohol interpolymerized with each mole of phenol, and the resultant prepolymer is oxyalkylated with about 1-3 moles of an alkylene oxide selected from the group consisting of ethylene oxide and propylene oxide.

25. A process for preparing a hardened interpolymer comprising curing a reactive liquid water soluble oxyalkylated polyol prepolymer in the presence of an acid catalyst to produce the said hardened interpolymer, the said prepolymer comprising at least three interpolymerized monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1-8 carbon atoms which is interpolymerizable with the said hydroxy aromatic compound, and (c) furfuryl alcohol and being oxyalkylated with about 1-10 moles of an alkylene oxide containing about 2-4 carbon atoms, the said prepolymer having a viscosity of about 1000–500,000 centipoises at 25° C. and containing about 1.1–6 moles of interpolymerized aldehyde and about 3.1–15 moles of interpolymerized furfuryl alcohol for each mole of the hydroxy aromatic compound interpolymerized therewith.

26. The process of claim 25 wherein the said prepolymer has about 1.5–3 moles of the said aldehyde and about 3.1–8 moles of furfuryl alcohol interpolymerized with each mole of the said hydroxy aromatic compound.

27. The process of claim 25 wherein the said liquid prepolymer to be cured has present therein about 1–10 moles of unpolymerized furfuryl alcohol for each mole of the said interpolymerized hydroxy aromatic compound, and the said unpolymerized furfuryl alcohol is cured with the said liquid prepolymer.

28. The process of claim 25 wherein the said hydroxy aromatic compound is phenol and the said aldehyde is formaldehyde.

29. The process of claim 28 wherein the said prepolymer has about 1.1–3 moles of formaldehyde and about 3.1–8 moles of furfuryl alcohol interpolymerized with each mole of phenol, and the resultant prepolymer is oxyalkylated with about 1–3 moles of an alkylene oxide selected from the group consisting of ethylene oxide and propylene oxide.

30. The process of claim 28 wherein the said liquid prepolymer to be cured has present therein about 1–10 moles of unpolymerized furfuryl alcohol for each mole of interpolymerized phenol, and the said unpolymerized furfuryl alcohol is cured with the said liquid prepolymer.

31. The process of claim 30 wherein the said prepolymer has about 1.5–3 moles of formaldehyde and about 3–1.8 moles of furfuryl alcohol interpolymerized with each mole of phenol, the resultant prepolymer is oxyalkylated with about 1–3 moles of an alkylene oxide selected from the group consisting of ethylene oxide and propylene oxide, and about 3–8 moles of unpolymerized furfuryl alcohol are present for each mole of interpolymerized phenol.

32. A process for preparing a rigid cellular interpolymer comprising curing a reactive oxyalkylated polyol prepolymer in the presence of a foaming agent and an acid catalyst to produce the said cellular interpolymer, the said prepolymer comprising at least three interpolymerized monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1–8 carbon atoms which is interpolymerizable with the said hydroxy aromatic compound, and (c) furfuryl alcohol and being oxyalkylated with about 1–10 moles of an alkylene oxide containing about 2–4 carbon atoms, the said prepolymer having a viscosity of about 1000–500,000 centipoises at 25° C. and containing about 1.1–6 moles of interpolymerized aldehyde and about 3.1–15 moles of interpolymerized furfuryl alcohol for each mole of the hydroxy aromatic compound interpolymerized therewith.

33. The process of claim 32 wherein the said prepolymer has about 1.5–3 moles of the said aldehyde and about 3.1–8 moles of furfuryl alcohol interpolymerized with each mole of the said hydroxy aromatic compound.

34. The process of claim 32 wherein the said liquid prepolymer to be cured has present therein about 1–10 moles of unpolymerized furfuryl alcohol for each mole of the said interpolymerized hydroxy aromatic compound, and the said unpolymerized furfuryl alcohol is cured with the said liquid prepolymer.

35. The process of claim 32 wherein the said prepolymer contains less than 1% by weight of unpolymerized furfuryl alcohol whereby the resultant cellular interpolymer has a predominantly closed cell structure.

36. The process of claim 32 wherein the said hydroxy aromatic compound is phenol and the said aldehyde is formaldehyde.

37. The process of claim 36 wheein the said prepolymer has about 1.1–3 moles of formaldehyde and about 3.1–8 moles of furfuryl alcohol interpolymerized with each mole of phenol, and the resultant prepolymer is oxyalkylated with about 1–3 moles of an alkylene oxide selected from the group consisting of ethylene oxide and propylene oxide.

38. The process of claim 36 wherein the said liquid prepolymer to be cured has present therein about 1–10 moles of unpolymerized furfuryl alcohol for each mole of interpolymerized phenol, and the said unpolymerized furfuryl alcohol is cured with the said liquid prepolymer.

39. The process of claim 38 wherein the said prepolymer has about 1.1–3 moles of formaldehyde and about 3.1–8 moles of furfuryl alcohol interpolymerized with each mole of phenol, the resultant prepolymer is oxyalkylated with about 1–3 moles of an alkylene oxide selected from the group consisting of ethylene oxide and propylene oxide, and about 3–8 moles of unpolymerized furfuryl alcohol are present for each mole of interpolymerized phenol.

40. The process of claim 36 wherein the said prepolymer contains less than 1% by weight of unpolymerized furfuryl alcohol whereby the resultant cellular interpolymer contains at least 85% of closed cells.

41. The process of claim 40 wherein the said prepolymer has about 1.5–3 moles of formaldehyde and about 3.1–8 moles of furfuryl alcohol interpolymerized with each mole of phenol, and the resultant prepolymer is oxyalkylated with about 1–3 moles of an alkylene oxide selected from the group consisting of ethylene oxide and propylene oxide.

42. A process for preparing a reactive liquid oxyalkylated polyol prepolymer which may be cured in the presence of an acid catalyst to produce a hardened interpolymer comprising interpolymerizing furfuryl alcohol with a substance interpolymerizable therewith selected from the group consisting of (1) an admixture containing (a) a hydroxy aromatic compound selected from the group consisting of phenol, resorcinol, cresol, xylenol, chlorophenol, bisphenol-A, alpha-naphthol and beta-naphthol and (b) an aldehyde containing about 1–8 carbon atoms which is interpolymerizable with the said hydroxy aromatic compound and (2) water soluble resoles of the said hydroxy aromatic compound and the said aldehyde, in an acidic aqueous reaction medium having a pH value below 5 to prepare a reactive liquid prepolymer, the said acidic aqueous reaction medium initially containing about 1.1–6 moles of the said aldehyde for each mole of the said hydroxy aromatic compound when based upon the monomeric and interpolymerized forms thereof and about 5–25 moles of furfuryl alcohol for each mole of the said hydroxy aromatic compound when based upon the monomeric and interpolymerized forms thereof, the said acidic aqueous reaction medium containing unpolymerized furfuryl alcohol in an amount of about 1–10 moles in excess of the amount of interpolymerized furfuryl alcohol present in the said prepolymer thus prepared for each mole of interpolymerized hydroxy aromatic compound, removing water and unreacted furfuryl alcohol from the resultant reaction mixture under reduced pressure until the prepolymer contains not more than about 1% by weight of water, and thereafter oxyalkylating the said prepolymer with about 1–10 moles of an alkylene oxide containing about 2–4 carbon atoms to produce a reactive liquid oxyalkylated polyol prepolymer which may be cured in the presence of an acid catalyst to prepare a hardened interpolymer, the said interpolymerization and oxyalkylation being continued until the oxyalkylated polyol prepolymer thus produced has a viscosity of about 1000–500,000 centipoises at 25° C. and contains about 1.1–6 moles of interpolymerized aldehyde and about 3.1–15 moles of interpolymerized furfuryl alcohol for each mole of the hydroxy aromatic compound interpolymerized therewith.

43. The process of claim 42 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound.

44. The process of claim 42 wherein the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound.

45. The process of claim 42 wherein the resultant oxyalkylated polyol prepolymer is oxyalkylated with about 1–3 moles of an alkylene oxide selected from the group consisting of ethylene oxide and propylene oxide.

46. The process of claim 42 wherein the said acidic aqueous medium has a pH value of about 1–3.

47. The process of claim 42 wherein the said hydroxy aromatic compound is phenol and the said aldehyde is formaldehyde.

48. The process of claim 42 wherein the said hydroxy aromatic compound, the said aldehyde and the said furfuryl alcohol are simultaneously interpolymerized in the acidic aqueous reaction medium.

49. The process of claim 48 wherein the said hydroxy aromatic compound is phenol and the said aldehyde is formaldehyde.

50. The process of claim 49 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, the said acidic aqueous reaction medium has a pH value of about 1–3, and the resultant oxyalkylated polyol prepolymer is oxyalkylated with about 1–3 moles of an alkylene oxide selected from the group consisting of ethylene oxide and propylene oxide.

51. The process of claim 42 wherein about 1.1–6 moles of the said aldehyde for each mole of the said hydroxy aromatic compound are interpolymerized in an alkline aqueous reaction medium having a pH value of about 7.5–11 to produce a water soluble resole-containing reaction mixture, about 5–25 moles of furfuryl alcohol for each mole of the said hydroxy aromatic compound are added to the resole-containing reaction mixture, the water soluble resole-containing reaction mixture is acidified to a pH value below 5 by addition of an acid thereto, and furfuryl alcohol is interpolymerized with the resole in the resultant acidic aqueous reaction medium.

52. The process of claim 51 wherein the said hydroxy aromatic compound is phenol and the said aldehyde is formaldehyde.

53. The process of claim 52 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, the said acidic aqueous reaction medium has a pH value of about 1–3, and the resultant oxyalkylated polyol prepolymer is oxyalkylated with about 1–3 moles of an alkylene oxide selected from the group consisting of ethylene oxide and propylene oxide.

54. The process of claim 42 wherein (a) a water soluble preformed resole containing about 1.1–6 moles of the said aldehyde interpolymerized with each mole of the said hydroxy aromatic compound, and (b) about 5–25 moles of furfuryl alcohol for each mole of the said hydroxy aromatic compound in the resole are interpolymerized in the said acidic aqueous reaction medium.

55. The process of claim 54 wherein the said hydroxy aromatic compound is phenol and the said aldehyde is formaldehyde.

56. The process of claim 55 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, the said acidic aqueous reaction medium has a pH value of about 1–3, and the resultant oxyalkylated polyol prepolymer is oxyalkylated with about 1–3 moles of an alkylene oxide selected from the group consisting of ethylene oxide and propylene oxide.

* * * * *